(12) United States Patent
Jian et al.

(10) Patent No.: US 7,266,354 B2
(45) Date of Patent: Sep. 4, 2007

(54) REDUCING THE PEAK-TO-AVERAGE POWER RATIO OF A COMMUNICATION SIGNAL

(75) Inventors: Heng-Yu Jian, Los Angeles, CA (US); Lennart Mathe, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1451 days.

(21) Appl. No.: 09/888,795

(22) Filed: Jun. 25, 2001

(65) Prior Publication Data

US 2002/0197970 A1    Dec. 26, 2002

(51) Int. Cl.
*H04B 1/06* (2006.01)

(52) U.S. Cl. .............. 455/245.2; 455/251.1; 455/245.1

(58) Field of Classification Search ........... 455/67.13, 455/556.1, 114.3, 144, 194.2, 211, 245.1, 455/245.2, 251.1, 256; 375/396; 342/373; 327/356
See application file for complete search history.

(56) References Cited

U.S. PATENT DOCUMENTS

| | | | |
|---|---|---|---|
| 5,302,914 A * | 4/1994 | Arntz et al. ............... 330/129 |
| 5,638,403 A | 6/1997 | Birchler et al. | |
| 5,710,990 A * | 1/1998 | Long et al. ................. 455/103 |
| 5,727,026 A * | 3/1998 | Beukema .................... 375/296 |
| 6,504,862 B1 * | 1/2003 | Yang .......................... 375/146 |
| 6,687,511 B2 * | 2/2004 | McGowan et al. ......... 455/522 |
| 2001/0006359 A1 * | 7/2001 | Suzuki et al. ................ 333/14 |
| 2003/0198299 A1 * | 10/2003 | Redfern ...................... 375/260 |

FOREIGN PATENT DOCUMENTS

| DE | 19548172 | 5/1996 |
|---|---|---|
| EP | 0977355 | 2/2000 |
| WO | WO 0054426 | 9/2000 |

* cited by examiner

*Primary Examiner*—Matthew Anderson
*Assistant Examiner*—Tan Trinh
(74) *Attorney, Agent, or Firm*—Coats & Bennett, P.L.L.C.

(57) ABSTRACT

Systems and methods are provided for reducing the peak to average ratio of signals, so that the signals can be amplified more efficiently. An error signal that corresponds to crests of the input signal is generated, and subtracted from the input signal. When a crest is so long that it corresponds to more than one sample, only the maximum sample contained in the crest is used to form the error signal. Optionally, multiple stages of decresting may be implemented sequentially.

36 Claims, 9 Drawing Sheets

REDUCING THE PEAK-TO-AVERAGE POWER RATIO OF A COMMUNICATION SIGNAL

BACKGROUND OF THE INVENTION

1. Field of the Invention

The present invention relates to improving communication signal amplification efficiency.

2. Background

Power amplifiers are more efficient when operated close to their maximum power output rating. For example, a 100 Watt power amplifier will be more efficient when it is outputting 90 Watts than when it is outputting half a Watt. With certain types of communication signals (e.g., frequency modulation), the amplitude of the signal is relatively constant, and it is possible to operate the amplifier near its maximum power rating at all times. But when the amplitude of the signal being amplified is sometimes small and sometimes large, this is no longer possible. For if an amplifier is designed to amplify peaks of the signal without distortion, the amplifier will not be operating close to its maximum power output rating whenever the it is not amplifying a peak.

The peak to average ratio is a measure of how far the peak power of a signal exceeds the average power of that signal. When a signal with a large peak to average ratio is amplified, the amplifier will spend most of its time operating far away from its maximum power output rating, and will be less efficient. Unfortunately, many modern communication signals have large peak to average ratios, so their amplifiers operate with very low efficiencies. Spread-spectrum signals (such as CDMA) are particularly bad offenders, with typical peak to average ratios ranging from six to thirteen dB.

One way to increase the operating efficiency of an amplifier is by modifying the signal to reduce its peak to average ratio before it is amplified. Of course, any modification to a communication signal will corrupt or distort the signal that is ultimately received at its end destination. But in most applications, some level of signal distortion is usually tolerable.

One prior art approach for reducing the peak to average ratio of an input waveform is to implement power clipping. In the power clipping approach, whenever the amplitude of the input signal is lower than a predetermined threshold, the input signal is passed to the output unchanged, and whenever the amplitude of the input signal exceeds the threshold, the output signal is clamped to the threshold level. Of course, the clipping operation destroys some of the information contained in the original signal. But the user should be able to tolerate this loss of information as long as the threshold is kept sufficiently high.

If an ideal power clipper with an infinite bandwidth were available, and the input signal 710 shown in FIG. 7A were applied to that ideal power clipper, the resulting output signal would resemble the curve 720 as shown in FIG. 7B. In real-world situations, however, deviations from this ideal behavior arise due in part to the limited bandwidth that may be transmitted into real-world channels.

FIG. 1 is a block diagram of a practical prior art approach for implementing power clipping. Signals arriving at input node 105 contain in-phase and quadrature (I and Q) components. These I and Q components are extracted in any conventional manner (not shown) and converted into amplitude and phase components (A and Φ) by the rectangular-to-polar converter 110. The amplitude component A is then provided as an input to an amplitude clipper 115. In addition, a threshold Th (generated by block 120) is provided to the amplitude clipper 115. Whenever the amplitude of the input signal A is lower than the threshold Th, the amplitude clipper 115 generates an output A' that is equal to the input amplitude. Whenever the amplitude A exceeds the threshold Th, the amplitude clipper 115 generates an output A' that is equal to the threshold value Th.

The clipped amplitude signal A' and the original phase signal are then provided to a polar-to-rectangular converter 125, which generates corresponding I and Q components. These components are then combined in any conventional manner (not shown) and provided to the up sampler 130 which increases the sample rate of the signal from the chip rate (C×1) to twice the chip rate (C×2). The output of the up sampler 130 is then filtered by a baseband filter 135, and the output 140 of the baseband filter 135 is provided to the succeeding stage of circuitry. The baseband filter 135 is necessary because output signals in real-world systems are only permitting to occupy a finite bandwidth.

Unfortunately, when signals with high-frequency components (like the waveform 720 shown in FIG. 7B) are processed by a practical baseband filter 135, the output 140 of the filter 135 will usually overshoot the threshold level Th. This overshooting undermines the effectiveness of the clipping function. To insure that the output signal always stays below the threshold level Th when a practical baseband filter 135 is used, the threshold generated by block 120 must be reduced to some level Th' that is below Th. Reducing the threshold to Th', however, destroys additional information, which may not be acceptable to the user. For example, for CDMA communication signals, it is difficult to achieve a peak to average ratio of less then 8 dB using power clipping without experiencing unacceptable levels of signal information destruction.

Decresting is a second prior art approach for reducing the peak to average ratio of an input waveform, while avoiding the overshoot problems caused by the baseband filter in the power clipper. In this approach, an error signal is created that represents the amount by which the input signal exceeds a threshold. This error signal is then subtracted from the original input signal in order to form a decrested output signal.

FIG. 2 is a block diagram of a prior art system for implementing decresting. The circuit shown in FIG. 2 is designed to operate after the baseband filter at a sample rate of two times the chip rate (C×2). Signals arriving at input node 205 contain I and Q components which are extracted and converted into amplitude and phase components (A and Φ) by the rectangular-to-polar converter 210. The amplitude component A is then provided as an input to a crest detector 220. In addition, a threshold Th (generated by block 215) is provided to the crest detector 220. Whenever the amplitude of the input signal A is lower than the threshold Th, the crest detector 220 generates an output E of zero. Whenever the amplitude A exceeds the threshold Th, the crest detector 220 generates an output E of A-Th. For example, if the input signal 730 shown in FIG. 7C is applied to the input node 205, the output E of the crest detector 220 would look like the wave 740 shown in FIG. 7D. Note that the signals processed by the circuits described herein are actually sampled versions of the analog waveforms shown in FIGS. 7A-7H.

The output E of the crest detector 220 and the original phase signal Φ are then provided to a polar-to-rectangular converter 225, which generates corresponding I and Q components. The output of the polar-to-rectangular converter 225 is filtered by the error filter 230. This error filter 230 is typically implemented as a finite-impulse-response (FIR) filter, and its characteristics are selected to meet out of band emission specification (because signals in real-world systems are only permitting to occupy a finite bandwidth). The filtered output of the error filter 230 is then subtracted from a delayed version of the input signal that has been generated by the delay element 240. Because only the error signal is filtered, the filtering process can only introduce overshoot into the error signal. And because the filtered error signal is subtracted from the original input signal, any overshoot will result in an output that is smaller than the threshold (rather than larger, as with the power clipper). Therefore, any overshoot introduced by the error filter does not increase the peak to average ratio of the signal being processed.

The prior art decresting arrangement of FIG. 2 works well for the error signal 740 shown in FIG. 7E, where the crest in the error signal 740 only contains a single sample 745, and when that sample 745 coincides with the peak of the crest. But when a crest in the error signal contains more than one sample, and/or when a crest in the error signal contains one sample that does not coincide with the maximum of the crest, the accuracy of the FIG. 2 decresting system is not as good. This accuracy problem is primarily caused by the impulse response of the error filter 230.

FIG. 7F is an example of one type of problematic input signal 750 with a crest that remains above the threshold Th for so long that two or more samples will occur during the crest. When this input signal 750 is provided to the decresting system of FIG. 2, the output of the crest detector 220 will look like the error signal 760 shown in FIG. 7G. Because this error signal 760 endures for such a long time, it will contain two samples 765A and 765B, as shown in FIG. 7H. When these two samples are processed by the FIR error filter 230 in quick succession, the second sample 765B will start to contribute to the output of the FIR filter before the contribution of the first sample 765A to the filter's output has had a chance to settle down (i.e., to decay). When this happens, the resulting output of the FIR error filter 230 will be the sum of the responses to each of the two input pulses 765A, 765B. This causes the output of the error filter 230 to be too large (i.e., to rise even higher than the amplitude of the error signal 760). When this too-large signal is subtracted from the delayed version of the input signal, the resulting output at node 245 will be lower then the threshold Th. This overcompensation undesirably increases the distortion of the output signal.

Another example of a problematic input signal is when a sample does not coincide with the maximum of the crest. In this situation, the amplitude of the sample that is provided to the input of the FIR error filter 230 would be smaller than the amplitude of the crest in the input signal. As a result, the error signal E generated by the error filter 230 would also be too small. When this too-small error signal is subtracted from the original input signal, the amplitude of the resulting output signal at node 245 ends up being larger than the threshold Th, so that the desired peak to average ratio is not attained. In order to avoid this undesirable result, the threshold Th may have to be adjusted to a setting Th' that is lower than Th. This lower threshold Th', however, may result in a loss of signal quality that is unacceptable to the user.

The inventors have recognized a need to reduce the peak to average ratio of signals while minimizing the loss of signal quality, in order to improve the amplification efficiency of those signals.

SUMMARY OF THE INVENTION

Systems and methods for increasing amplifier efficiencies while maintaining communication signal quality are provided.

One aspect of the present invention relates to a method of reducing a peak-to-average ratio of an input signal. In this method, an error signal that corresponds to crests of the input signal is formed. When a given crest of the input signal corresponds to more than one sample of the input signal, the error signal corresponding to the given crest contains only one sample having a maximum amplitude within the given crest. The input signal is then adjusted based on the error signal.

Another aspect of the present invention relates to a method of reducing a peak-to-average ratio of an input signal. In this method, an error signal that corresponds to crests of the input signal is formed. When a given crest of the input signal corresponds to more than one sample of the input signal, the error signal is substantially independent of samples that do not correspond to a maximum amplitude of the crest. The input signal is then adjusted based on the error signal.

Another aspect of the present invention relates to a method of reducing a peak-to-average ratio of an input signal. In this method, crests of the input signal are decrested based on only one sample of the input signal for each crest of the input signal. When a given crest contains more than one sample, the decresting is based on a sample of the given crest selected for having an amplitude that is larger than other samples of the given crest.

Another aspect of the present invention relates to a method of reducing a peak-to-average ratio of an input signal. In this method, short crests of the input signal that correspond to only one sample of the input signal are detected, and long crests of the input signal that correspond to more than one sample of the input signal are detected. For each detected long crest, respectively, a sample of the input signal having a maximum amplitude is selected. Each of the short crests, respectively, is decrested based on a sample of the input signal that corresponds to the respective short crest. Each of the long crests, respectively, is decrested based on the sample selected in the selecting step for the respective long crest.

Another aspect of the present invention relates to a signal amplification system with a peak power factor reducer including a local peak detector.

Another aspect of the present invention relates to a base station that includes a power amplifier and a peak power factor reducer. The peak power factor reducer is coupled to the power amplifier, and includes a local peak detector to improve the power amplifier efficiency.

Another aspect of the present invention relates to a method for improving the efficiency of an amplifier. In this method, a first maximum signal amplitude sample value is detected from a first group of signal amplitude sample values derived from a input signal. A first error signal is generated based on the first maximum signal amplitude sample value while eliminating other signal amplitude sample values of the first group of signal amplitude sample values. The first input signal is decrested with the first error signal so as to reduce overshoot and undershoot of the decresting that occurs due to quick variations in several signal amplitude sample values of the first group of signal amplitude sample values.

DETAILED DESCRIPTION OF THE PREFERRED EMBODIMENTS

Figure 3:
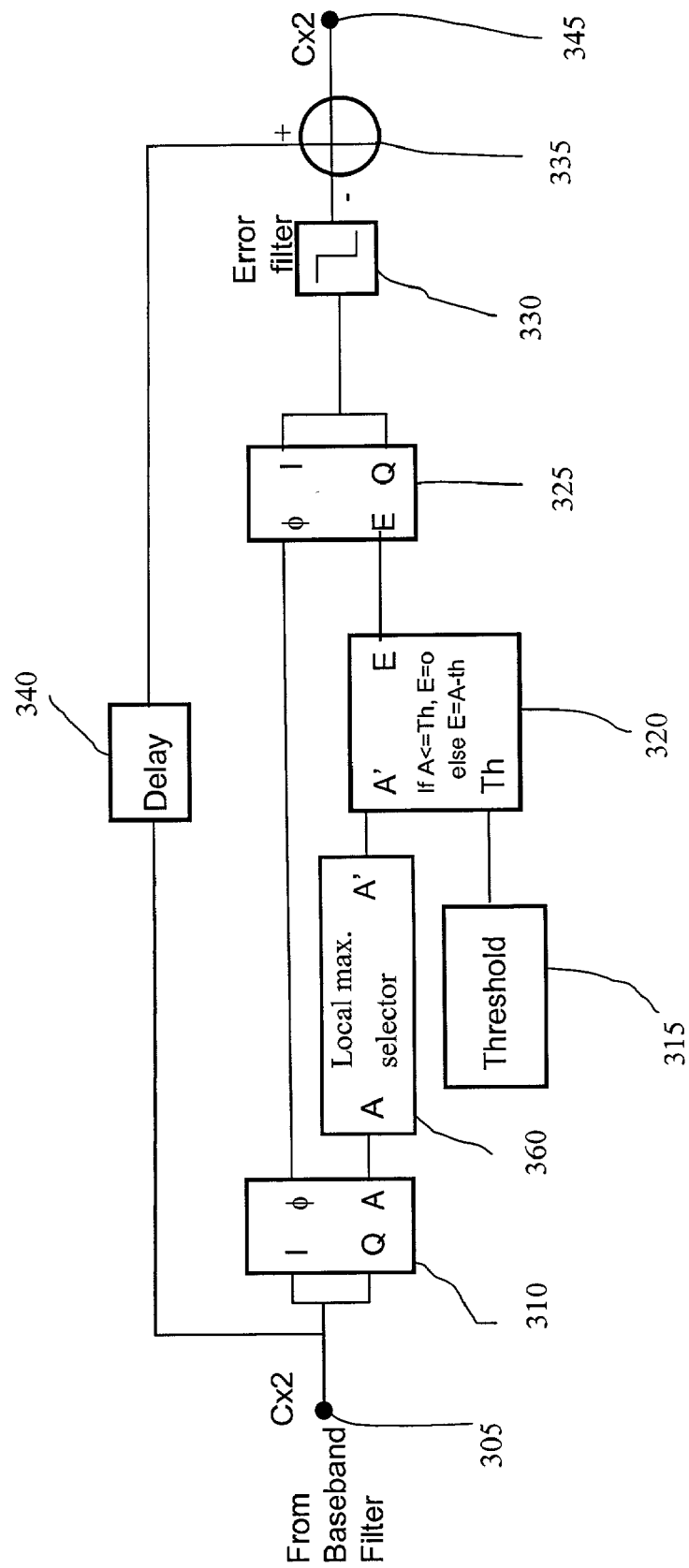
FIG. 3 is a functional block diagram of a single stage embodiment of the present invention.

FIG. 3 is a block diagram of a new approach for implementing decresting in accordance with an embodiment of the present invention. The FIG. 3 embodiment preferably operates after the baseband filter at a sample rate of at least two times the chip rate (C×2). Signals arriving at input node 305 contain I and Q components which are extracted and converted into amplitude and phase components (A and Φ) by the rectangular-to-polar converter 310. The amplitude component A is then provided as an input to a preprocessor 360 on route from the converter 310 to the crest detector 320.

When a crest contains only a single sample, the preprocessor 360 passes that sample to the crest detector 320. Under these input conditions, the FIG. 3 embodiment operates in exactly the same way as the prior art configuration of FIG. 2. When a crest contains more then one sample, however, the preprocessor 360 selects the sample with the largest amplitude, and passes that one sample to the crest detector 320. The preprocessor 360 replaces all the remaining samples in that crest with values that are below the threshold Th of the crest detector 320 (e.g., with zeros). Of course, the preprocessor 360 will have to include a number of delay stages so that it can determine which one of the incoming samples is the largest. But any delay introduced by the preprocessor 360 can be compensated for by increasing the delay in the delay element 340 by a corresponding number of samples.

A threshold Th (generated by block 315) is provided to the crest detector 320. The crest detector 320 is configured so that whenever the amplitude of the crest detector's input signal is lower than the threshold Th, the crest detector 320 generates an output E of zero. Whenever the amplitude A' exceeds the threshold Th, the crest detector 320 generates an output E of A'-Th.

When the preprocessor 360 outputs the maximum sample from the crest, it should synchronize the output so that it coincides with the maximum sample that was selected from the input signal (adjusted, of course, for any processing delay). Thus, the preprocessor 360 and the crest detector 320 operate together to generate a single sample for each detected crest, synchronized to coincide with the maximum of that crest.

The output E of the crest detector 320 and the original phase signal Φ are then converted back into rectangular coordinates by the polar-to-rectangular converter 325 and provided as an input to the error filter 330. The error filter 330 in this embodiment is also an FIR filter with characteristics selected to meet an out of band emission specification. The filtered output of the error filter 330 is subtracted from a delayed version of the input signal that has been generated by the delay element 340. But because the error filter 330 will only receive one input pulse for any given crest of the input signal, it becomes impossible to excite the FIR filter with a second pulse before the FIR filter has had time to settle down from the excitation caused by any given pulse. As a result, the output of the error filter 330 will not include any significant overshoot. So when the output of the error filter 330 is subtracted from the delayed version of the input signal (arriving via delay element 340), the error signal will not be too large, and the correct amount of decresting will be provided.

This arrangement provides the benefits of avoiding both overshoot and undershoot of the error filter 330, by generating a filtered error signal that more closely corresponds to the true crests of the input signal. When this filtered error signal is subtracted from the delayed input signal in subtractor 335, the resulting difference will conform with the peak to average ratio that corresponds to the originally selected threshold Th, without unduly destroying information contained in the signal.

Figure 7A:
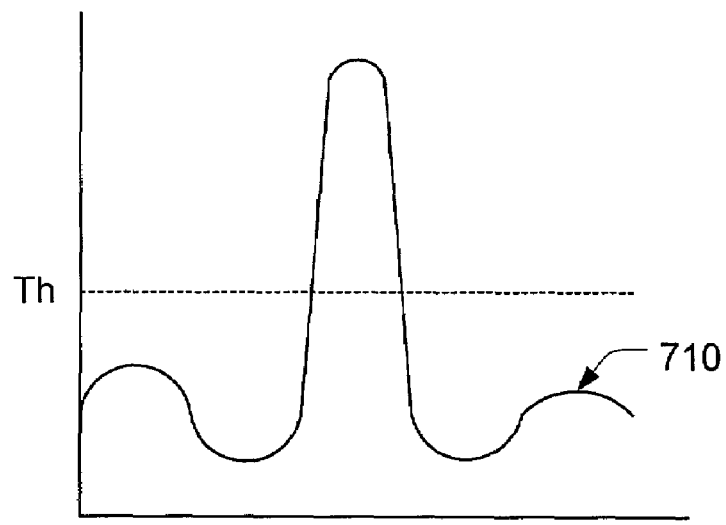
FIGS. 7A-7H are graphs of signal waveforms that are used to illustrate the operation of the circuits described herein.
Figure 7B:
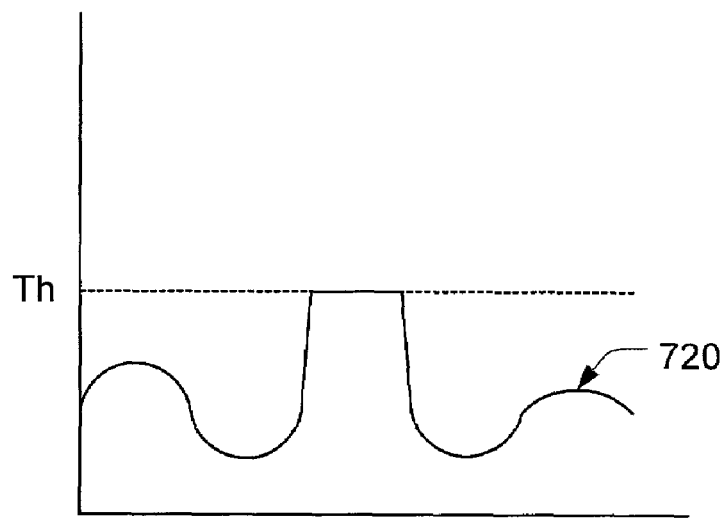
Figure 7C:
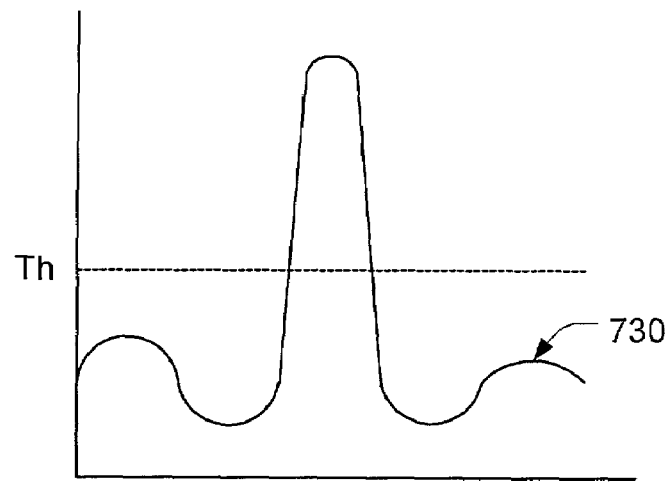
Figure 7D:
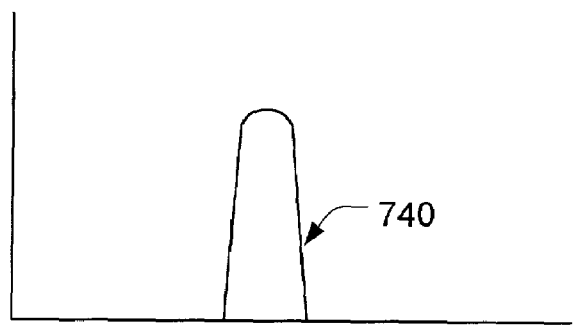
Figure 7E:
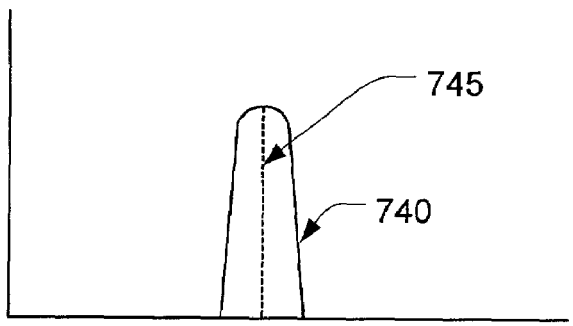
Figure 7F:
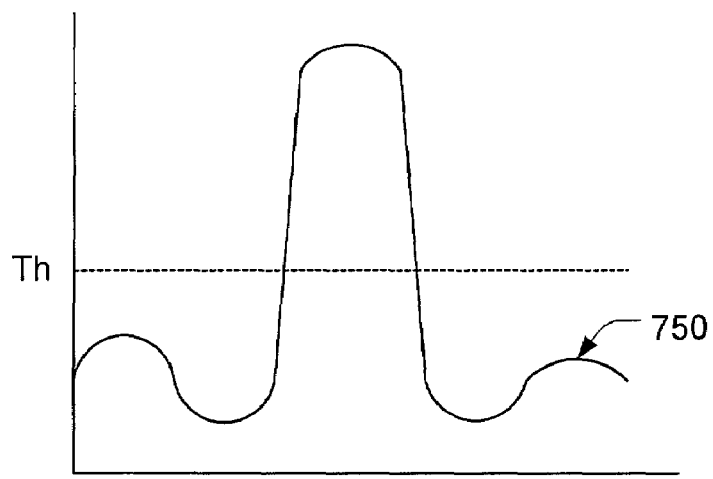
Figure 7G:
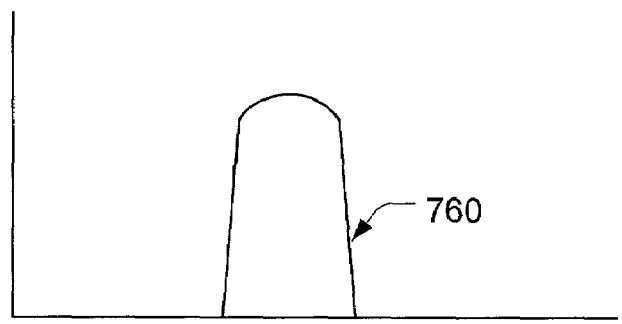
Figure 7H:
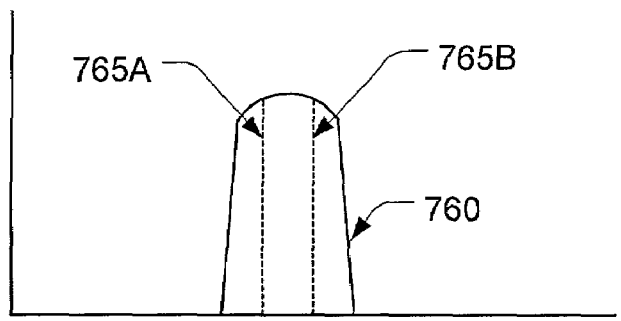
Figure 4:
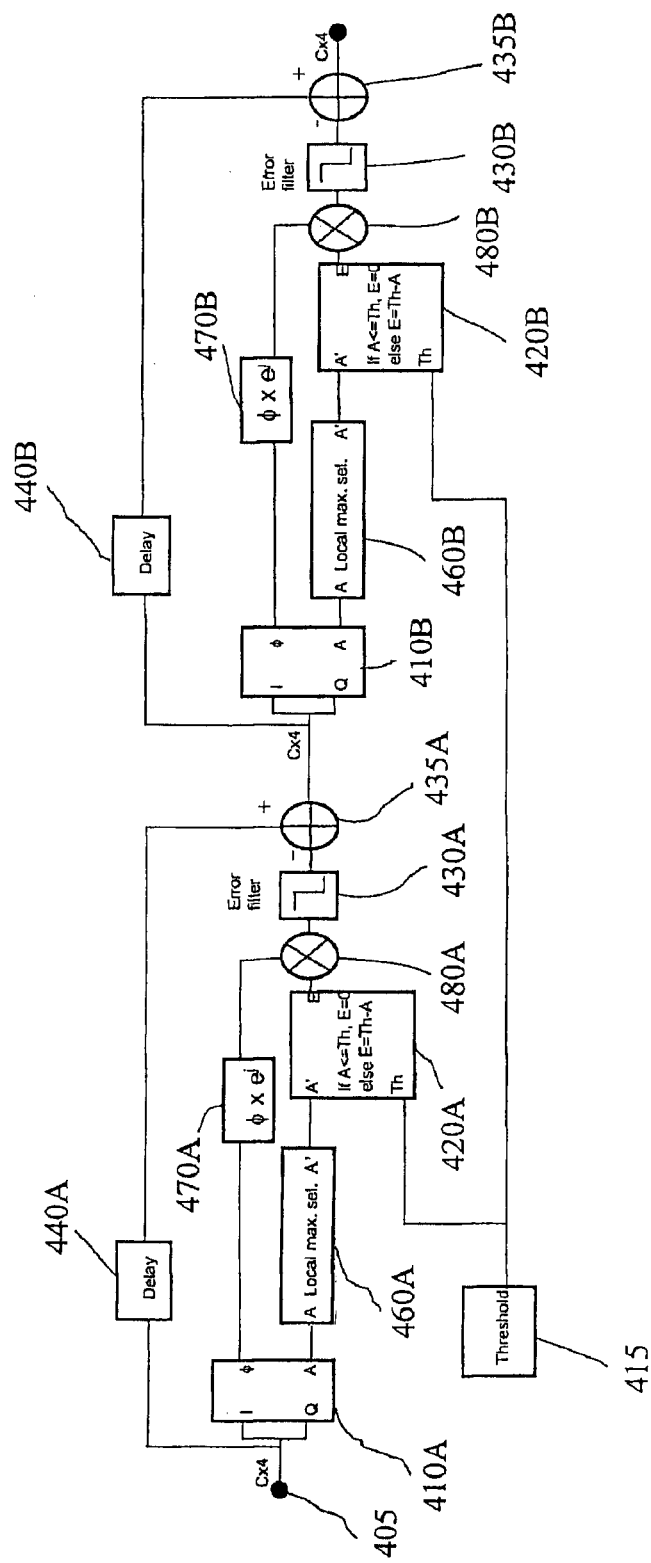

The decresting process implemented using the FIG. 3 embodiment provides more accurate results when the peak of the error signal is aligned in time with the peak of the input signal. One way to improve the alignment of those two signals is to up sample the input signal before the input signal is processed. For example, the sample rate of the input signal may be increased from two times the chip rate (C×2) to four times the chip rate (C×4). Increasing the sampling rate in this manner allows the system to more accurately determine the exact location of the peak of the crest in cases where that peak happens to occur between two samples of the original input signal. For example, the true peak of the waveform 760 shown in FIG. 7H occurs at the midpoint between the two samples 765A and 765B. When up sampling is used to increase the sampling rate, the result will include extra samples that should be closer in time to the peak of the crest than the original samples.

The accuracy of the system can be further improved by cascading two or more stages of decresting processing. Preferably, the output of each decresting stage is provided directly to the input of the next decresting stage, and both stages use the same threshold Th. In one two-stage embodiment, each stage of decresting may be implemented using a circuit that is identical to the circuit shown in FIG. 3.

Figure 4:
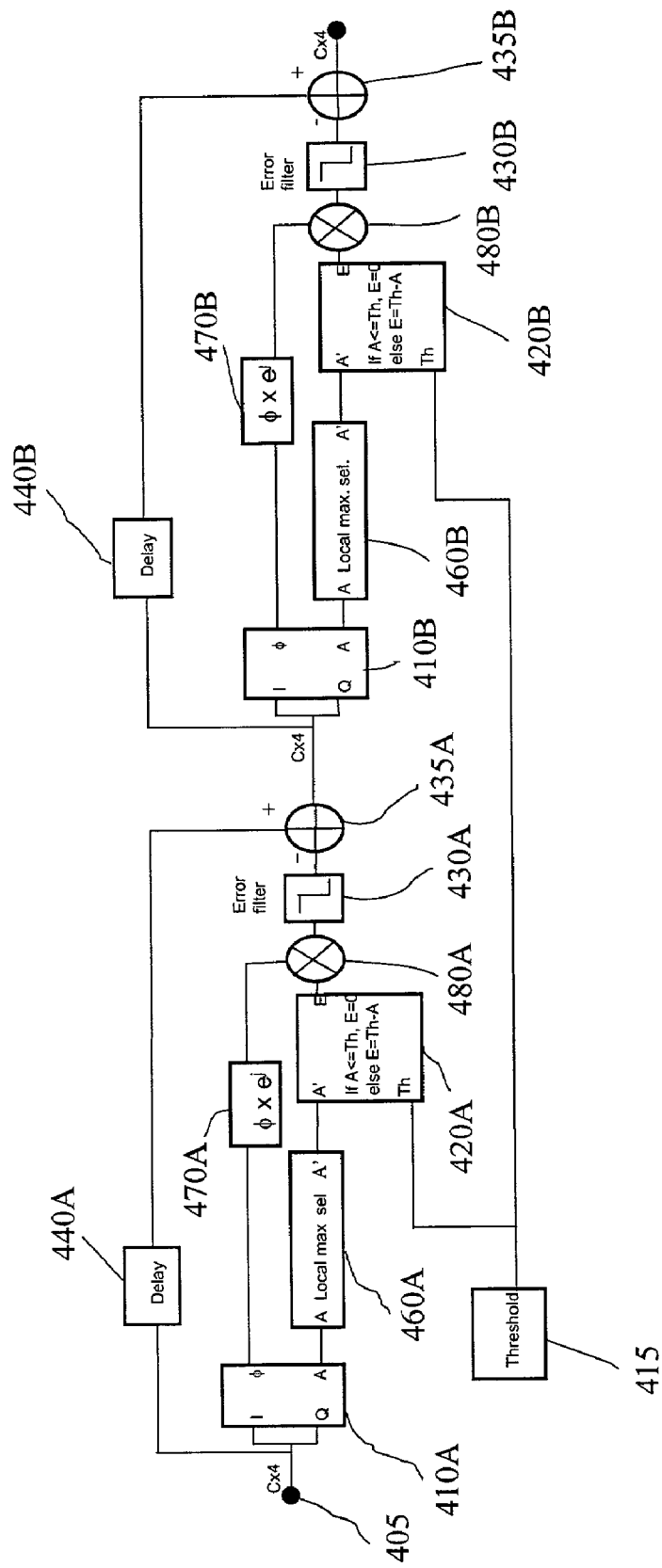
FIG. 4 is a functional block diagram of a two stage embodiment of the present invention.

FIG. 4 is a block diagram of another embodiment of a two-stage decrester. Each decresting stage of this embodiment is similar to the decresting circuit shown in FIG. 3, except the polar-to-rectangular converter 325 in the FIG. 3 embodiment is replaced with phase angle-to-frequency converters 470A, 470B and mixers 480A, 480B in order to convert the polar representation of the signal to the corresponding I and Q components at the input to the error filters 430A, 430B. The output of each mixer 480A, 480B is provided to the corresponding error filter 430A, 430B, and the subtractor 435A, 435B subtracts the output of each error filter 430A, 430B from a delayed version of the signal being processed (which is generated by the delay element 440A, 440B). Note that the operation of each of the remaining items 410A-460A and 410B-460B in this embodiment is similar to the correspondingly numbered items 310-360 in the FIG. 3 embodiment described above.

In the FIG. 4 embodiment, both stages use the same threshold Th, which is generated by the threshold block 415. Notably, the second stage immediately follows the first stage, and the system operates at a sample rate at four times the chip rate (C×4). A Matlab model of the two-stage decresting embodiment is attached as Appendix A.

Figure 5:
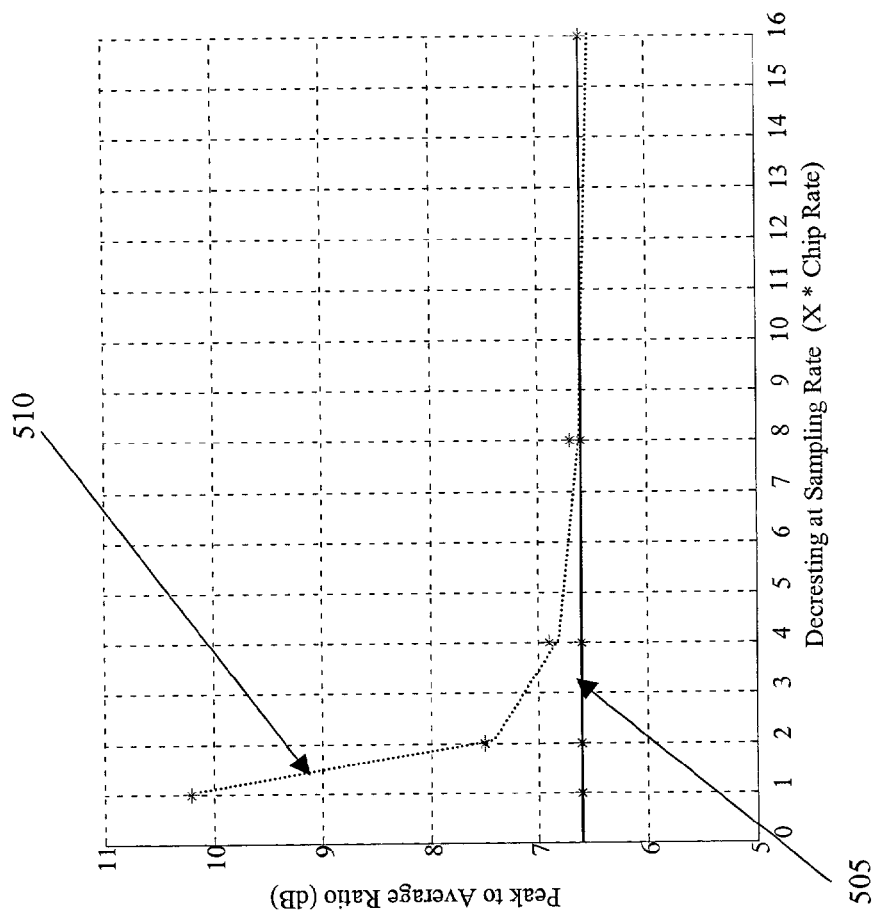
FIG. 5 is a graph that compares the performance of the FIG. 4 embodiment when it is operated at various different sampling rates.

The decresting operation in the embodiments shown in FIGS. 3 and 4 may be implemented at different sampling rates. FIG. 5 is a graph that shows the relationship of the sampling rate to the peak to average ratio for the circuit of FIG. 4. When decresting is implemented at a sampling rate of one times chip rate (C×1), the peak to average ratio performance of the circuit will be over 10 dB. The peak to average ratio drops to 7½ dB when decresting is implemented at C×2, and to below 7 dB at C×4, as indicated on the curve 510. While further increases in the sampling rate will reduce the peak to average ratio even further, the marginal benefits of approaching the asymptote 505 may not be worth the increased cost and complexity associated with ever higher sampling rates.

Note that whenever an output at a higher sampling rate is required, it is not advisable to perform up sampling after the decresting, because the filtering associated with up sampling can introduce overshoot that increases the peak to average ratio beyond the value that corresponds to the selected threshold Th. Instead, it is preferable to up sample first, and then perform the decresting at the higher chip rate, so that any overshoot beyond the threshold Th introduced by the up sampling can be removed by the decresting process.

Figure 6:
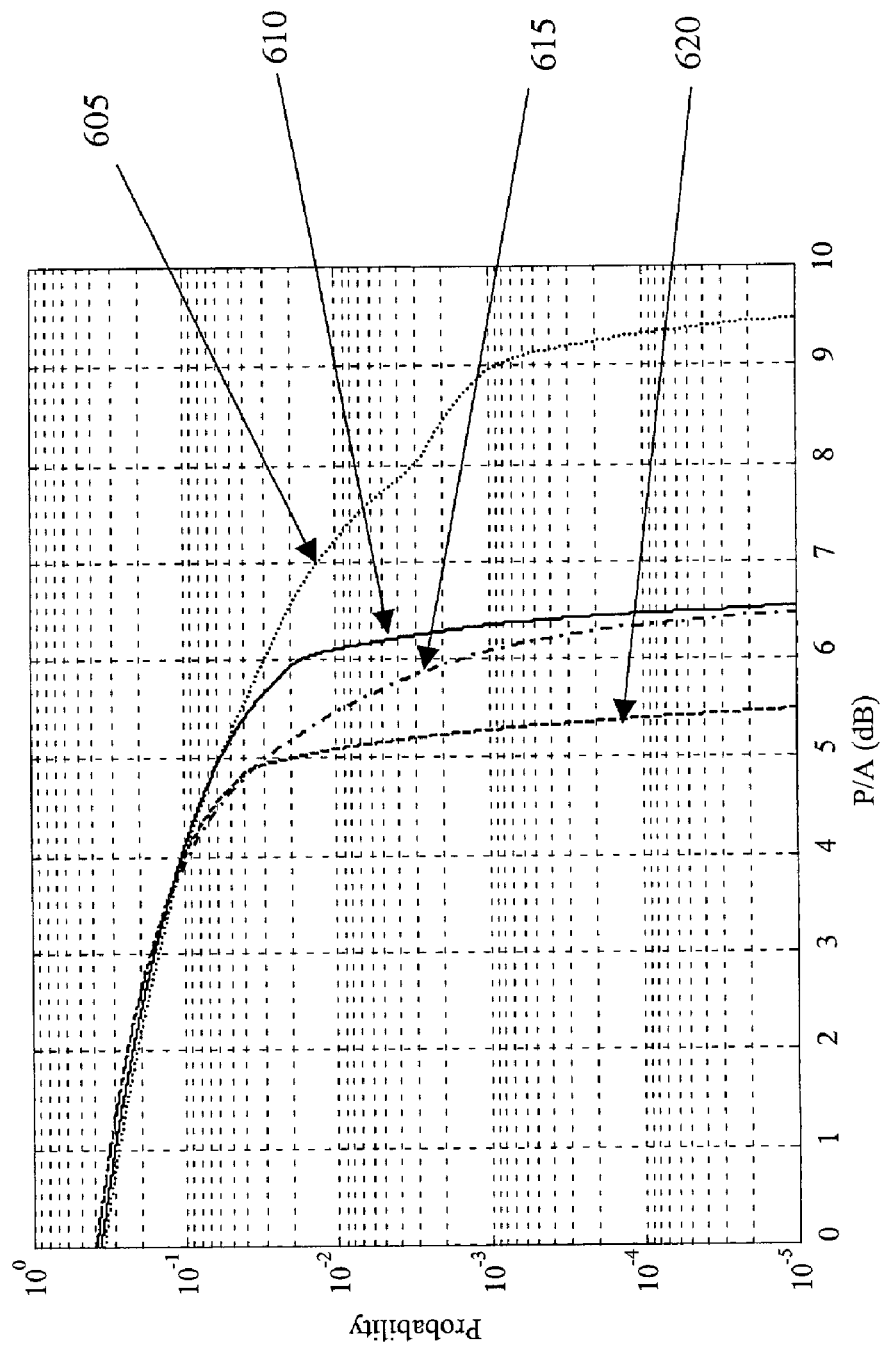
FIG. 6 is a graph that compares the peak-to-average power performance of the present invention with the performance of the prior art.

The peak to average performances for a number of different decresting approaches are compared in FIG. 6. Each of these curves shows a relationship between a peak to average ratio measured in decibels and the probability that a signal will exceed the given peak to average ratio. The probability curve 605 shows the characteristics for a typical CDMA signal with a peak to average ratio of 9½ dB, with no decresting.

Figure 1:
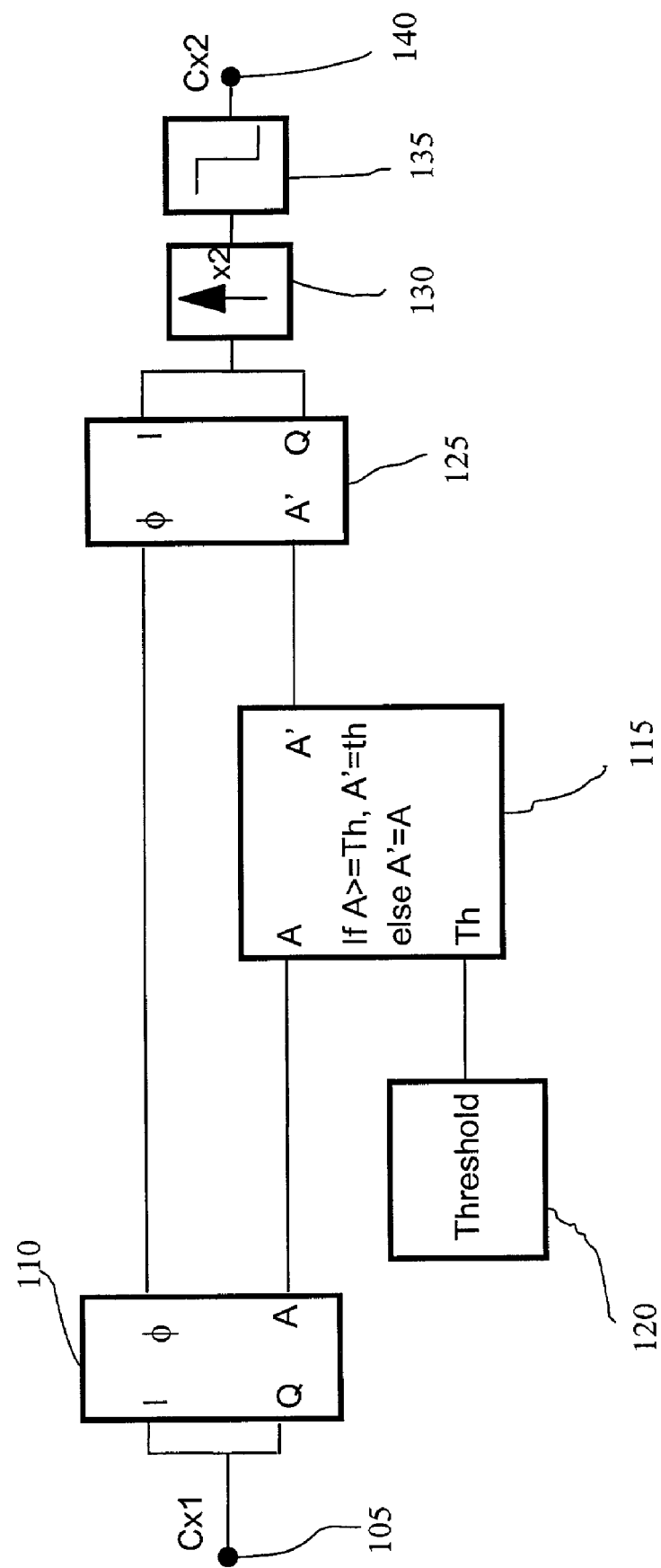
FIG. 1 is a functional block diagram of a first prior art system for reducing the peak to average ratio.
Figure 2:
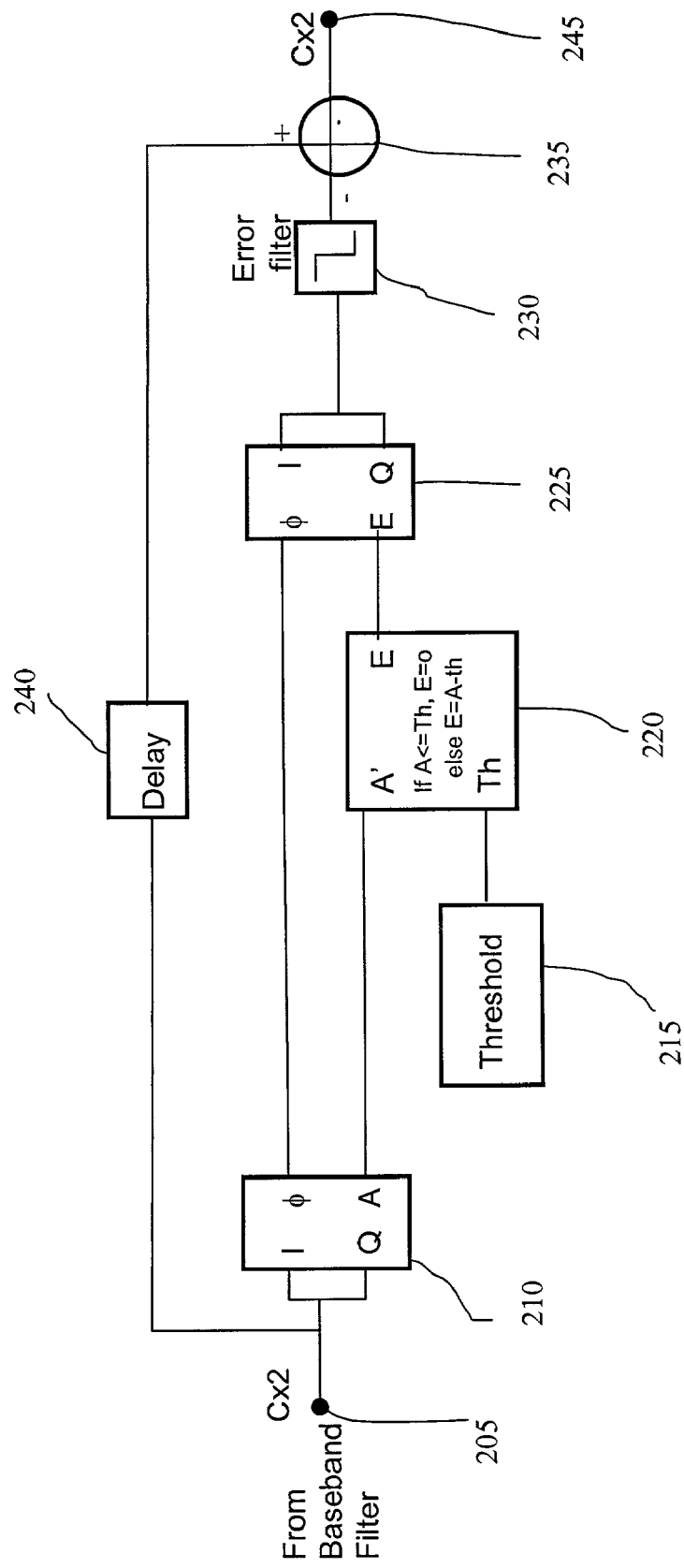
FIG. 2 is a functional block diagram of a second prior art system for reducing the peak to average ratio.

The probability curve 615 shows the characteristics of the same CDMA signal after it has been decrested by the FIG. 2 prior art decresting approach, with the threshold Th set to provide a peak to average ratio of 6½ dB. At this threshold setting, the FIG. 2 circuit limits signals that are 6½% dB above the average, but also distorts signals that are between 5 and 6½ dB above the average. Note that the distance between the original CDMA curve 605 and the probability curve 615 provides a rough measure of this distortion.

The probability curve 610 shows the characteristics of the same CDMA signal after being decrested using the decresting circuit of FIG. 4, with the threshold Th also set to provide a peak to average ratio of 6½ dB. At this threshold setting, the FIG. 4 circuit limits signals that are 6½ dB above the average, but with much lower distortion than the FIG. 2 prior art circuit. Note that the distance between the original CDMA curve 605 and this probability curve 610 is much smaller than for the curve 615 for the FIG. 2 circuit, particularly for signals that are between 5 and 6 dB above the average. Thus, the FIG. 4 circuit can be used to provide the same level of peak to average ratio reduction as the FIG. 2 prior art circuit, but with improved noise performance.

Alternatively, the FIG. 4 circuit can be used to provide an improved peak to average ratio reduction, with the same noise performance as the FIG. 2 prior art circuit. The probability curve 620 shows the characteristics of the original CDMA signal after being decrested using the decresting circuit of FIG. 4, with the threshold Th set to provide a peak to average ratio of 5½ dB. At this threshold setting, the FIG. 4 circuit limits signals that are only 5½ dB above the average, but still provides distortion that is similar to the FIG. 2 prior art circuit when the FIG. 2 circuit is set to limit signals that are 6½ dB above the average.

By adjusting the threshold Th, improvements in peak to average ratio performance can also be traded off against error distortion to any desired intermediate level (i.e., between the curves 610 and 620).

Reducing the peak to average ratio by even a small amount can have significant impact on the efficiency of power amplifiers located downstream of the decrester. For example, reducing the peak to average ratio for a CDMA signal with an average power of twenty Watts just one dB, from 8 dB to 7 dB, would reduce the peak power requirements for the power amplifier from 125 W to 100 W. That power reduction translates to significant cost savings, as will be appreciated by persons skilled in the relevant arts.

It will be appreciated by those skilled in the art that the above-described processes may be implemented on a suitably programmed digital signal processor, or by using discrete hardware. Optionally, an existing single digital processor may be reprogrammed to implemented the above-described processes.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

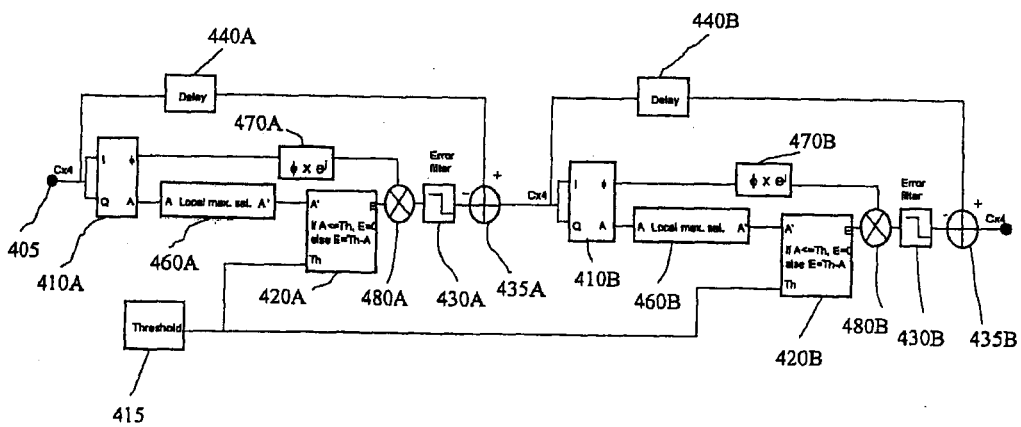

What is claimed is:

1. A method of reducing a peak-to-average ratio of an input signal, comprising the steps of:
    forming an error signal that corresponds to crests of the input signal, wherein, when a given crest of the input signal corresponds to more than one sample of the input signal, the error signal is substantially independent of samples that do not correspond to a maximum amplitude of the crest; and
    adjusting the input signal based on the error signal.

2. The method of claim 1,
    wherein the adjusting step comprises subtracting the error signal corresponding to each crest from the input signal,
    wherein the forming step comprises the step of filtering the error signal to conform with an out-of-band transmission specification, and
    wherein the forming and adjusting steps are implemented at a sampling rate of at least four times the chip rate, and
    wherein the method further comprises the step of power-amplifying an outcome of the subtracting step.

3. The method of claim 1, further comprising the step of power-amplifying an outcome of the adjusting step.

4. The method of claim 1, wherein the adjusting step comprises subtracting the error signal corresponding to each crest from the input signal.

5. The method of claim 4, wherein the error signal is subtracted from a delayed version of the input signal.

6. The method of claim 1, wherein the forming step comprises the step of filtering the error signal to conform with an out-of-band transmission specification.

7. The method of claim 1, further comprising the steps of repeating the forming and adjusting steps on an outcome of the adjusting step.

8. The method of claim 1, wherein the forming and adjusting step are implemented at a sampling rate of at least four times the chip rate.

9. The method of claim 1,
wherein the adjusting step comprises subtracting the error signal corresponding to each crest from the input signal,
wherein the forming step comprises the step of filtering the error signal to conform with an out-of-band transmission specification, and
wherein the forming and adjusting steps are implemented at a sampling rate of at least four times the chip rate, and
wherein the method further comprises the step of power-amplifying an outcome of the subtracting step.

10. A method of reducing a peak-to-average ratio of an input signal, comprising the steps of:
detecting short crests of the input signal that correspond to only one sample of the input signal;
detecting long crests of the input signal that correspond to more than one sample of the input signal;
selecting, for each detected long crest, respectively, a sample of the input signal having a maximum amplitude;
decresting each of the short crests, respectively, based on the sample of the input signal that corresponds to the respective short crest; and
decresting each of the long crests, respectively, based on the sample selected in the selecting step for the respective long crest.

11. The method of claim 10, further comprising the step of power-amplifying an outcome of the decresting step.

12. The method of claim 10, wherein each decresting step comprises the step of subtracting a signal corresponding to each crest from the input signal.

13. The method of claim 12, wherein each decresting step further comprises the step of filtering the signal corresponding to each crest to conform with an out-of-band transmission specification prior to implementing the subtracting step.

14. The method of claim 10, further comprising the steps of repeating the detecting, selecting, and decresting steps on an outcome of each decresting step.

15. The method of claim 14, further comprising the step of power-amplifying an outcome of the repeating steps.

16. The method of claim 10, wherein the detecting, selecting, and decresting steps are implemented at a sampling rate of at least four times the chip rate.

17. A signal amplification system, comprising:
a peak power factor reducer including a first local peak detector, a first decrester coupled with said first local peak detector, and a second decrester coupled to said first decrester.

18. The system of claim 17, further including a second local peak detector coupled to said second decrester.

19. The system of claim 18, wherein said first local peak detector selects a first sample value from among a first group of sample values, said first sample having the highest amplitude among said first group of sample values.

20. The system of claim 19, wherein said second local peak detector selects a second sample value from among a second group of sample values, said sample having the highest amplitude among said second group of sample values.

21. The system of claim 20, wherein said first decrester includes:
a first rectangular to polar converter having first inphase (I) and first quadrature (Q) signal inputs coupled to a first input signal and a first amplitude (A) output and first phase ($\Phi$) output signal, an input of said first local peak detector coupled to said A output;
a first amplitude threshold discriminator including a first local peak input (A'), a first threshold (Th) input, and a first error output (E), said A' input coupled to an output of said first peak detector;
a first threshold generator coupled to the first Th input of said first amplitude threshold discriminator, said first threshold generator providing a first threshold value to said first amplitude threshold discriminator;
a first multiplier coupled to said first error output and said first phase signal, said first multiplier multiplying said first error output signal by said first phase signal;
a first error filter coupled to said first multiplier and receiving said phase adjusted error signal and generating a first filtered error signal from said first multiplier; and
a first subtractor coupled to said first filtered error signal and a delayed first input signal, said first subtractor outputting a first stage decrested signal.

22. The system of claim 21, wherein said second decrester includes:
a second rectangular to polar converter having second inphase (I) and second quadrature (Q) signal inputs coupled to said first stage decrested signal and a second amplitude (A) output and second phase ($\Phi$) output signal, an input of said second local peak detector coupled to said A output;
a second amplitude threshold discriminator including a second local peak input (A'), a second threshold (Th) input, and a second error output (E), said A' input coupled to an output of said second peak detector;
a second threshold generator coupled to the second Th input of said second amplitude threshold discriminator, said second threshold generator providing a second threshold value to said second amplitude threshold discriminator;
a second multiplier coupled to said second error output and said second phase signal, said second multiplier multiplying said second error output signal by said second phase signal;
a second error filter coupled to said second multiplier and receiving said phase adjusted error signal and generating a second filtered error signal from said second multiplier; and
a second subtractor coupled to said second filtered error signal and a delayed second input signal, said second subtractor outputting a second stage decrested signal.

23. The system of claim 22, wherein said first input signal has a high peak-to-average power ratio, the first amplitude threshold and the second amplitude threshold are the same, and the first decrester is cascaded with the second decrester.

24. The system of claim 23, wherein said first input signal is a code division multiple access (CDMA) signal and the peak power factor reducer operates at a sample rate of four times a chip rate.

25. A base station, comprising:
a power amplifier; and
a peak power factor reducer coupled to said power amplifier, said peak power factor reducer including a first local peak detector to improve said power amplifier efficiency, a first decrester coupled with said first local peak detector, and a second decrester coupled to said first decrester.

26. The system of claim 25, further including a second local peak detector coupled to said second decrester.

27. The system of claim 26, wherein said first local peak detector selects a first sample value from among a first group of sample values, said first sample having the highest amplitude among said first group of sample values.

28. The system of claim 27, wherein said second local peak detector selects a second sample value from among a second group of sample values, said sample having the highest amplitude among said second group of sample values.

29. The system of claim 28, wherein said first decrester includes:
  a first rectangular to polar converter having first inphase (I) and first quadrature (Q) signal inputs coupled to a first input signal and a first amplitude (A) output and first phase ($\Phi$) output signal, an input of said first local peak detector coupled to said A output;
  a first amplitude threshold discriminator including a first local peak input (A'), a first threshold (Th) input, and a first error output (E), said A' input coupled to an output of said first peak detector;
  a first threshold generator coupled to the first Th input of said first amplitude threshold discriminator, said first threshold generator providing a first threshold value to said first amplitude threshold discriminator;
  a first multiplier coupled to said first error output and said first phase signal, said first multiplier multiplying said first error output signal by said first phase signal;
  a first error filter coupled to said first multiplier and receiving said phase adjusted error signal and generating a first filtered error signal from said first multiplier; and
  a first subtractor coupled to said first filtered error signal and a delayed first input signal, said first subtractor outputting a first stage decrested signal.

30. The system of claim 29, wherein said second decrester includes:
  a second rectangular to polar converter having second inphase (I) and second quadrature (Q) signal inputs coupled to said first stage decrested signal and a second amplitude (A) output and second phase ($\Phi$) output signal, an input of said second local peak detector coupled to said A output;
  a second amplitude threshold discriminator including a second local peak input (A'), a second threshold (Th) input, and a second error output (E), said A' input coupled to an output of said second peak detector;
  a second threshold generator coupled to the second Th input of said second amplitude threshold discriminator, said second threshold generator providing a second threshold value to said second amplitude threshold discriminator;
  a second multiplier coupled to said second error output and said second phase signal, said second multiplier multiplying said second error output signal by said second phase signal;
  a second error filter coupled to said second multiplier and receiving said phase adjusted error signal and generating a second filtered error signal from said second multiplier; and
  a second subtractor coupled to said second filtered error signal and a delayed second input signal, said second subtractor outputting a second stage decrested signal.

31. The system of claim 30, wherein said first input signal has a high peak-to-average power ratio, the first amplitude threshold and the second amplitude threshold are the same, and the first decrester is cascaded with the second decrester.

32. The system of claim 31, wherein said first input signal is a code division multiple access (COMA) signal and the peak power factor reducer operates at a sample rate of four times a chip rate.

33. A method for improving the efficiency of an amplifier, comprising the steps of:
  detecting a first maximum signal amplitude sample value from a first group of signal amplitude sample values derived from an input signal;
  generating a first error signal based on said first maximum signal amplitude sample value while eliminating other signal amplitude sample values of said first group of signal amplitude sample values;
  decresting said first input signal with said first error signal so as to reduce overshoot and undershoot of said decresting that occurs due to quick variations in several signal amplitude sample values of said first group of signal amplitude sample values;
  detecting a second maximum signal amplitude sample value from a second group of signal amplitude sample values derived from a previously decrested signal;
  generating a second error signal based on said second maximum signal amplitude sample value while eliminating other signal amplitude sample values of said second group of signal amplitude sample values; and
  decresting said second input signal with said second error signal so as to reduce overshoot and undershoot of said decresting that occurs due to quick variations in several signal amplitude sample values of said second group of signal amplitude sample values.

34. The method of claim 33, wherein the input signal has a high peak-to-average power ratio and said peak-to-average power ratio is reduced.

35. The method of claim 34, wherein said input signal is a code division multiple access (CDMA) signal.

36. The method of claim 35, wherein said amplifier operates closer to saturation and less signal information is eliminated.

* * * * *

UNITED STATES PATENT AND TRADEMARK OFFICE
CERTIFICATE OF CORRECTION

PATENT NO. : 7,266,354 B2
APPLICATION NO. : 09/888795
DATED : September 4, 2007
INVENTOR(S) : Jian et al.

It is certified that error appears in the above-identified patent and that said Letters Patent is hereby corrected as shown below:

The title page showing the illustrative figure should be deleted to be replaced with the attached title page.

The drawing sheet, consisting of Fig. 4, should be deleted to be replaced with the drawing sheet, consisting of Fig. 4, as shown on the attached pages.

In Column 7, Line 42, delete "6½%" and insert -- 6½ --, therefor.

In Column 9, Line 23, in Claim 10, before "sample" delete "the" and insert -- a --, therefor.

In Column 12, Line 13, in Claim 32, delete "(COMA)" and insert -- (CDMA) --, therefor.

Signed and Sealed this

Eighteenth Day of May, 2010

David J. Kappos
*Director of the United States Patent and Trademark Office*

(12) United States Patent
Jian et al.

(10) Patent No.: US 7,266,354 B2
(45) Date of Patent: Sep. 4, 2007

(54) REDUCING THE PEAK-TO-AVERAGE POWER RATIO OF A COMMUNICATION SIGNAL

(75) Inventors: Heng-Yu Jian, Los Angeles, CA (US); Lennart Mathe, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1451 days.

(21) Appl. No.: 09/888,795

(22) Filed: Jun. 25, 2001

(65) Prior Publication Data

US 2002/0197970 A1 Dec. 26, 2002

(51) Int. Cl.
 H04B 1/06 (2006.01)
(52) U.S. Cl. .............................. 455/245.2; 455/251.1; 455/245.1
(58) Field of Classification Search ............ 455/67.13, 455/556.1, 114.3, 144, 194.2, 211, 245.1, 455/245.2, 251.1, 256; 375/396; 342/373; 327/356
See application file for complete search history.

(56) References Cited

U.S. PATENT DOCUMENTS

| 5,302,914 | A | * | 4/1994 | Arntz et al. ............... 330/129 |
| 5,638,403 | A | | 6/1997 | Birchler et al. |
| 5,710,990 | A | * | 1/1998 | Long et al. ............... 455/103 |
| 5,727,026 | A | * | 3/1998 | Beukema ............... 375/296 |
| 6,504,862 | B1 | * | 1/2003 | Yang ............... 375/146 |
| 6,687,511 | B2 | * | 2/2004 | McGowan et al. ......... 455/522 |
| 2001/0006359 | A1 | * | 7/2001 | Suzuki et al. ............... 333/14 |
| 2003/0198299 | A1 | * | 10/2003 | Redfern ............... 375/260 |

FOREIGN PATENT DOCUMENTS

| DE | 19548172 | 5/1996 |
| EP | 0977355 | 2/2000 |
| WO | WO 0054426 | 9/2000 |

* cited by examiner

Primary Examiner—Matthew Anderson
Assistant Examiner—Tan Trinh
(74) Attorney, Agent, or Firm—Coats & Bennett, P.L.L.C.

(57) ABSTRACT

Systems and methods are provided for reducing the peak to average ratio of signals, so that the signals can be amplified more efficiently. An error signal that corresponds to crests of the input signal is generated, and subtracted from the input signal. When a crest is so long that it corresponds to more than one sample, only the maximum sample contained in the crest is used to form the error signal. Optionally, multiple stages of decresting may be implemented sequentially.

36 Claims, 9 Drawing Sheets